(12) United States Patent
Ahn

(10) Patent No.: US 8,739,193 B2
(45) Date of Patent: May 27, 2014

(54) OPTICAL DISC DRIVE DEVICE AND METHOD OF DRIVING THE SAME

(75) Inventor: Cheol-woong Ahn, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 119 days.

(21) Appl. No.: 13/404,058

(22) Filed: Feb. 24, 2012

(65) Prior Publication Data
US 2012/0297401 A1 Nov. 22, 2012

(30) Foreign Application Priority Data

May 17, 2011 (KR) .................. 10-2011-0046385

(51) Int. Cl.
*G11B 17/26* (2006.01)
(52) U.S. Cl.
USPC .......................................................... 720/624
(58) Field of Classification Search
USPC .......................................................... 720/624
See application file for complete search history.

(56) References Cited

U.S. PATENT DOCUMENTS

| | | | |
|---|---|---|---|
| 6,137,761 A * | 10/2000 | Oh et al. ........................ | 720/620 |
| 7,080,390 B2 * | 7/2006 | Toyama et al. ................ | 720/659 |
| 7,360,226 B2 * | 4/2008 | Shimozaki .................... | 720/619 |
| 7,577,966 B2 * | 8/2009 | Ogasawara et al. ........... | 720/624 |
| 7,814,504 B2 * | 10/2010 | Aoki et al. .................... | 720/624 |
| 7,844,979 B2 * | 11/2010 | Satoh ........................... | 720/619 |
| 7,937,720 B2 * | 5/2011 | Inoue et al. .................. | 720/624 |
| 8,042,126 B2 * | 10/2011 | Sato ............................. | 720/619 |
| 8,104,051 B2 * | 1/2012 | Suzui ........................... | 720/624 |
| 8,127,318 B2 * | 2/2012 | Suzui ........................... | 720/624 |
| 8,381,605 B2 * | 2/2013 | Onishi et al. .................. | 74/53 |

FOREIGN PATENT DOCUMENTS

| | | |
|---|---|---|
| JP | 7-235118 | 9/1995 |
| JP | 2000-048462 | 2/2000 |
| KR | 10-2009-0070047 | 7/2009 |
| KR | 10-2009-0084513 | 8/2009 |

OTHER PUBLICATIONS

Korean Office Action issued Dec. 6, 2012 in counterpart Korean Patent Application No. 10-2011-0046385 (4 pages, in Korean).

* cited by examiner

*Primary Examiner* — Mark Blouin
(74) *Attorney, Agent, or Firm* — NSIP Law

(57) ABSTRACT

A disc loading device includes a loading motor, a loading roller that is driven by the loading motor and that loads and unloads a disc, a gear device provided between the loading motor and the loading roller, the gear device including a plurality of gears, and a power train control device which is configured to control power between the plurality of gears, wherein the power train control device operatively disconnects a power transmission train between the plurality of gears when the disc is unloaded.

23 Claims, 13 Drawing Sheets

OPTICAL DISC DRIVE DEVICE AND METHOD OF DRIVING THE SAME

CROSS-REFERENCE TO RELATED PATENT APPLICATIONS

This application claims the benefit of Korean Patent Application No. 10-2011-0046385, filed on May 17, 2011, in the Korean Intellectual Property Office, the entire disclosure of which is incorporated herein in by reference for all purposes.

BACKGROUND

1. Field

The following description relates to an optical disc drive device and a method of driving the same, and additionally, to an optical disc drive device of a slot-in type using a roller, and a method of driving the same.

2. Description of the Related Art

Optical disc drive devices typically have one of two disc loading structures—a tray type loading structure and a slot-in type loading structure. The slot-in type optical disc drive devices generally have one of two type of disc holding structures a lever type disc holding structure and a roller type disc holding structure. In a lever type optical disc drive device, a lever holds an edge of a disc. In a roller type optical disc drive device, rollers contact the opposite sides of a disc. Thus, in a roller type optical disc drive device, a roller is covered with a protection material so as to protect a recording surface of a disc.

A roller is connected to a drive motor through a power transfer structure using a plurality of gears. Accordingly, when a drive motor is stopped, it is difficult to insert or remove a disc in or from the roller type optical disc drive device. If one tries to forcibly insert or remove a disc from the roller type optical disc drive device, the disc may be damaged caused by friction between the disk and a roller whose motion is restricted by the drive motor.

To prevent damage of a disc, the roller is designed to rotate in response to a certain amount of pressure when the optical disc drive device is in an unengaged state with relation to a shaft. However, friction between the roller and the disc generated before the roller rotates in an unengaged state with the disc and damage to a recording surface generated accordingly may not be prevented during the forcible insertion. Also, a sense of unsmooth touch occurs while forcibly inserting a disc, and thus, the actual quality of use may deteriorate.

SUMMARY

In one general aspect, there is provided a disc loading device. The disc loading device includes a motor, a gear assembly which is operatively driven by the motor, the gear assembly comprising at least one gear, a loading roller that is configured to load and unload a disc into and out of the disc loading device; and a power train control system that is configured to (i) operatively engage the gear assembly with the loading roller such that the motor is operatively coupled with the loading roller, and (ii) disengage the gear assembly from the loading roller such that the motor is operatively decoupled from the loading roller.

The power train control system may include an idle gear that is configured to be coupled or decoupled with at least one gear of the gear assembly.

The idle gear may be coaxially formed with one of the at least one gear of the gear assembly, the gear with which the idle gear is formed has a diameter different from that of the idle gear and is engaged with another of the at least one gear of the gear assembly, which is adjacent to the motor, the idle gear is coupled to a cam lever which is coaxially coupled to a gear in the gear assembly that is adjacent to the motor, and the idle gear is engaged with or disengaged from another of the at least one gear which is adjacent to the loading motor based on pivoting of the cam lever.

The disc loading device may include a slider assembly at least partially operatively driven by the motor, wherein engagement and disengagement of the power train control system is controlled by displacement of the slider assembly.

The slider assembly may include a main slider comprising (i) a gear that operatively engages the gear assembly such that the gear assembly drives displacement of the slider assembly, and (ii) a cam, forming part of the power train control system, the cam being configured to operatively control positioning of at least one gear of the gear assembly. The slider assembly may also include a sub slider that is operatively coupled to the main slider, the sub slider comprising a gear that operatively engages the gear assembly so as to drive further displacement of the slider assembly.

The disc loading device may include a chucking unit that is configured to fix the disc to a spindle, and a disc guide which guides insertion of the disc. The slider assembly operatively may control the chucking unit. The disc guide may include a pusher which engages the main slider.

The power train control system further comprises an idle gear that is configured to be coupled or decoupled with at least one gear of the gear assembly.

The power train control system may include a cam lever to which the idle gear is coupled, the cam lever being coupled to at least one gear of the gear assembly so as to be capable of coaxially pivoting, and a cam plate, which is configured to operate the cam lever, the cam plate being provided on the main slider.

The cam plate may have a channel type cam formed therein, and wherein a working pin for operation of the cam lever is provided on the cam lever, the working pin being positioned so as to be controlled by the channel type cam.

The disc drive may be included in an electronic device. The electronic device may be one of a portable game console, a portable/personal multimedia player (PMP), a portable laptop PC, a desktop PC, a high definition television (HDTV), an optical disc player, and an optical disc recorder.

The gear assembly may be disengaged when the disc is unloaded.

In another aspect, there is provided a disc drive device. The disc drive device may include a chuck that fixes a disc to a spindle, a chucking unit which controls the chuck, a motor, a loading roller that is driven by the motor and that loads and transfers the disc toward the chuck, a gear assembly which is operatively driven by the motor, the gear assembly comprising at least one gear, and a power train control system that is configured to (i) operatively engage the gear assembly with the loading roller such that the motor is operatively coupled with the loading roller, and (ii) disengage the gear assembly from the loading roller such that the motor is operatively decoupled from the loading roller.

The power train control system may include an idle gear that is configured to be coupled or decoupled with at least one gear of the gear assembly.

The idle gear may be coaxially formed with one of the at least one gear of the gear assembly, the gear with which the idle gear is formed has a diameter different from that of the idle gear and is engaged with another of the at least one gear of the gear assembly, which is adjacent to the motor, the idle gear is coupled to a cam lever which is coaxially coupled a gear included in the gear assembly that is adjacent to the motor, and the idle gear is engaged with or disengaged from another of the at least one gear which is adjacent to the loading motor based on pivoting of the cam lever.

The disc loading device may include a slider assembly at least partially operatively driven by the motor, wherein engagement and disengagement of the power train control unit is controlled by displacement of the slider assembly.

The slider assembly may include a main slider comprising (i) a gear that operatively engages the gear assembly such that the gear assembly drives displacement of the slider assembly, and (ii) a cam, forming part of the power train control system, the cam being configured to operatively control positioning of at least one gear of the gear assembly. The slider assembly may also include a sub slider that is operatively coupled to the main slider, the sub slider comprising a gear that operatively engages the gear assembly so as to drive further displacement of the slider assembly.

The disc drive device may include a disc guide which guides insertion of the disc, and a chucking unit which controls the chuck, wherein the slider assembly operatively controls the chucking unit, and the disc guide includes a pusher which engages the main slider.

The power train control system may include an idle gear that is configured to be coupled or decoupled with at least one gear of the gear assembly.

The power train control system may include a cam lever to which the idle gear is coupled, the cam lever being coaxially coupled to at least one gear of the gear assembly so as to be capable of pivoting, and a cam plate which is configured to operate the cam lever, the cam plate being provided on the main slider.

The cam plate may have a channel type cam formed therein. The cam lever may include a working pin that is positioned so as to operatively controlled by the channel type cam.

The disc drive device may be included in an electronic device. The electronic device may be one of a portable game console, a portable/personal multimedia player (PMP), a portable lap-top PC, a desktop PC, a high definition television (HDTV), an optical disc player, and an optical disc recorder.

The gear assembly train may be disengaged when the disc is unloaded.

In another aspect, there is provided a disc loading method. The disc loading method includes loading a disc in a disc drive device by using a loading roller that is driven by a motor through a power transmission train, and unloading the disc by using the loading roller, wherein, in the unloading of the disc, the power transmission train between the loading roller and the loading motor is disengaged, and in the loading of the disc, the power transmission train is engaged.

The power transmission train may include a gear assembly and an idle gear that connects and disconnects power between the gear assembly, and the power transmission train is operatively controlled by the idle gear.

The disc loading method may include adjusting a position of the idle gear by a cam structure that is operated based on insertion of the disc.

Other features and aspects may be apparent from the following detailed description, the drawings, and the claims.

Figure 1A:
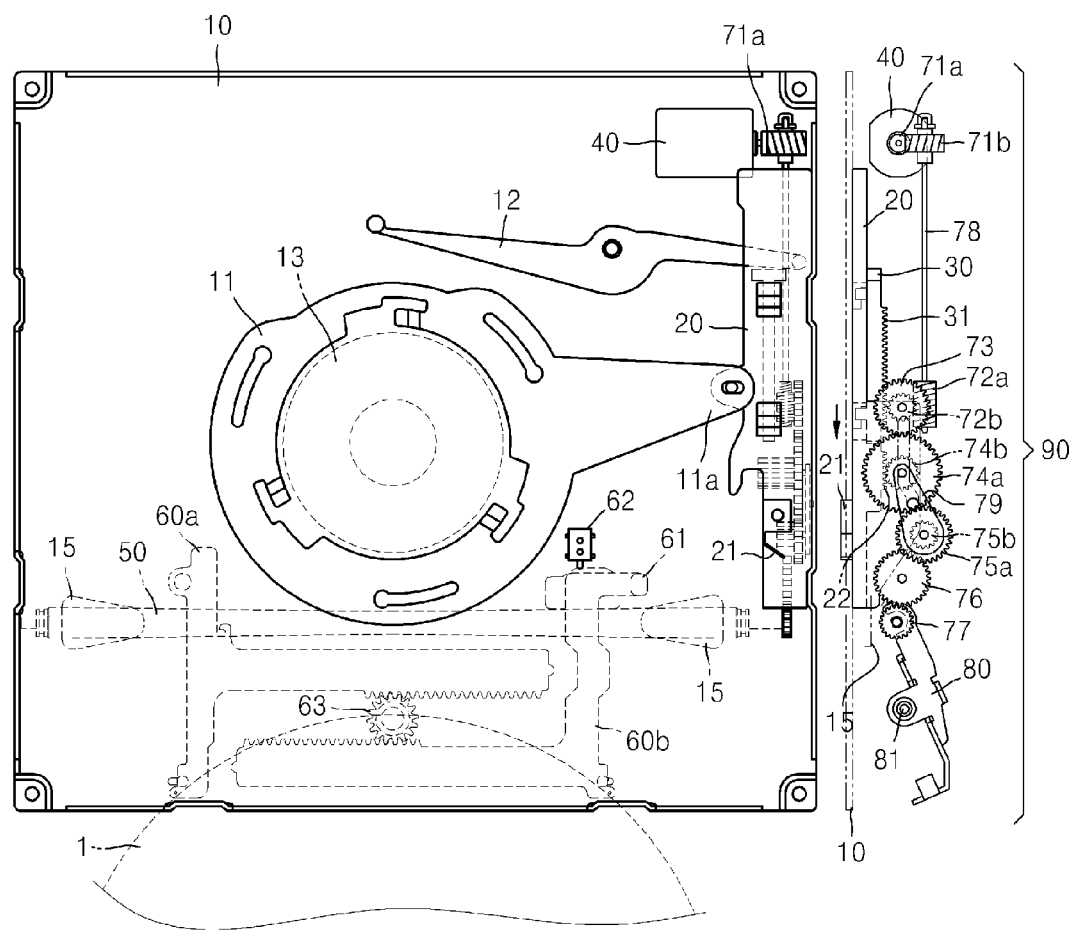
FIG. 1A is a diagram that illustrates an example of a structure of a disc loading apparatus in an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1B:
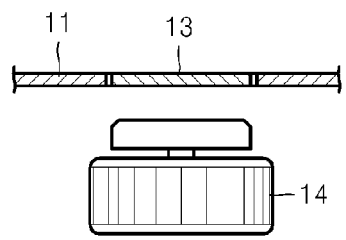
FIG. 1B is a diagram that illustrates an example of a relation between a chuck of a disc loading apparatus and a spindle disposed thereunder.
Figure 2:
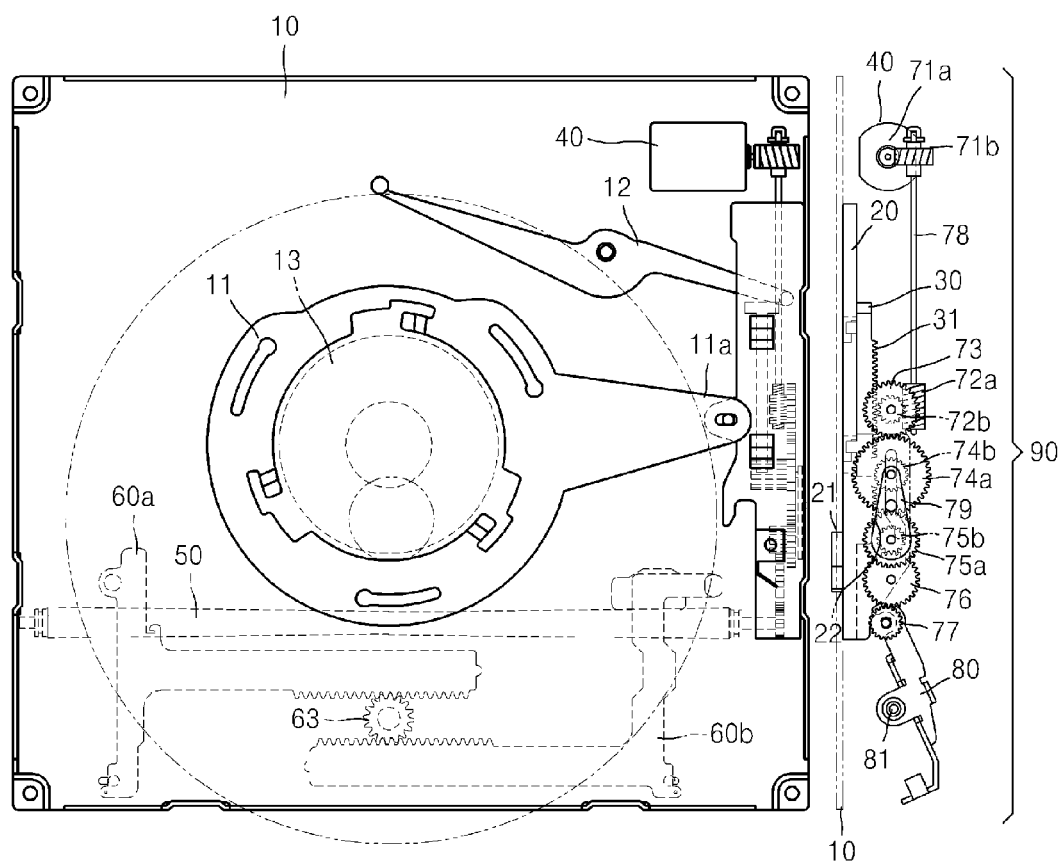
FIG. 2 is a diagram that illustrates an example of a state in which a disc is loaded in a disc loading apparatus such as, for example, the disc loading apparatus illustrated in FIG. 1A.
Figure 3:
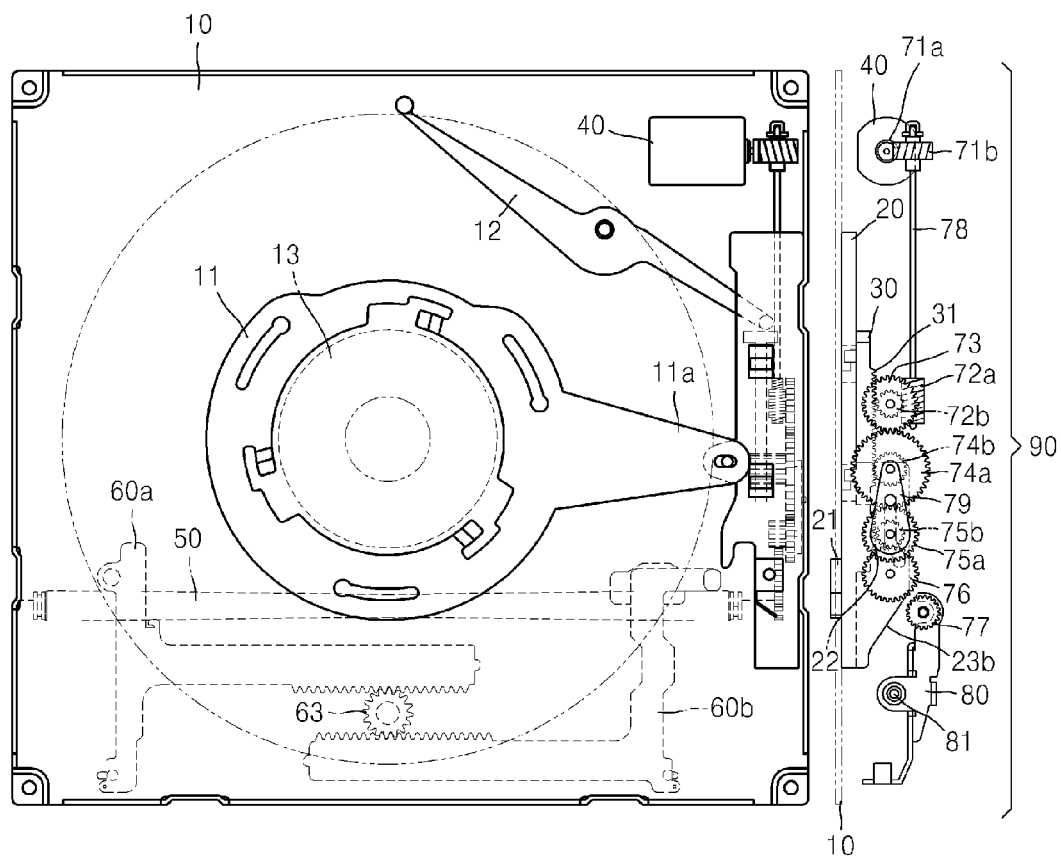
FIG. 3 is a diagram that illustrates an example of a state in which a disc is completely loaded in a disc loading apparatus such as, for example, the disc loading apparatus illustrated in of FIG. 1A.

FIGS. 1A-3 illustrate examples of a disc loading structure in a disc drive device. FIG. 1A illustrates an example of a state in which a disc (e.g., a storage medium such as an optical disc) is unloaded. FIG. 2 illustrates an example of a state in which a disc is loaded. FIG. 3 illustrates an example of a state in which the disc loading is completed. FIGS. 1A-3 include plan views and a side view for better understanding of a disc loading apparatus.

Major constituent elements for disc loading in a disc drive device are described with reference to FIG. 1A. The following description will focus on the structural structure and operation of a disc loading structure of a disc drive device, an example of which is illustrated in FIG. 1A.

Figure 4:
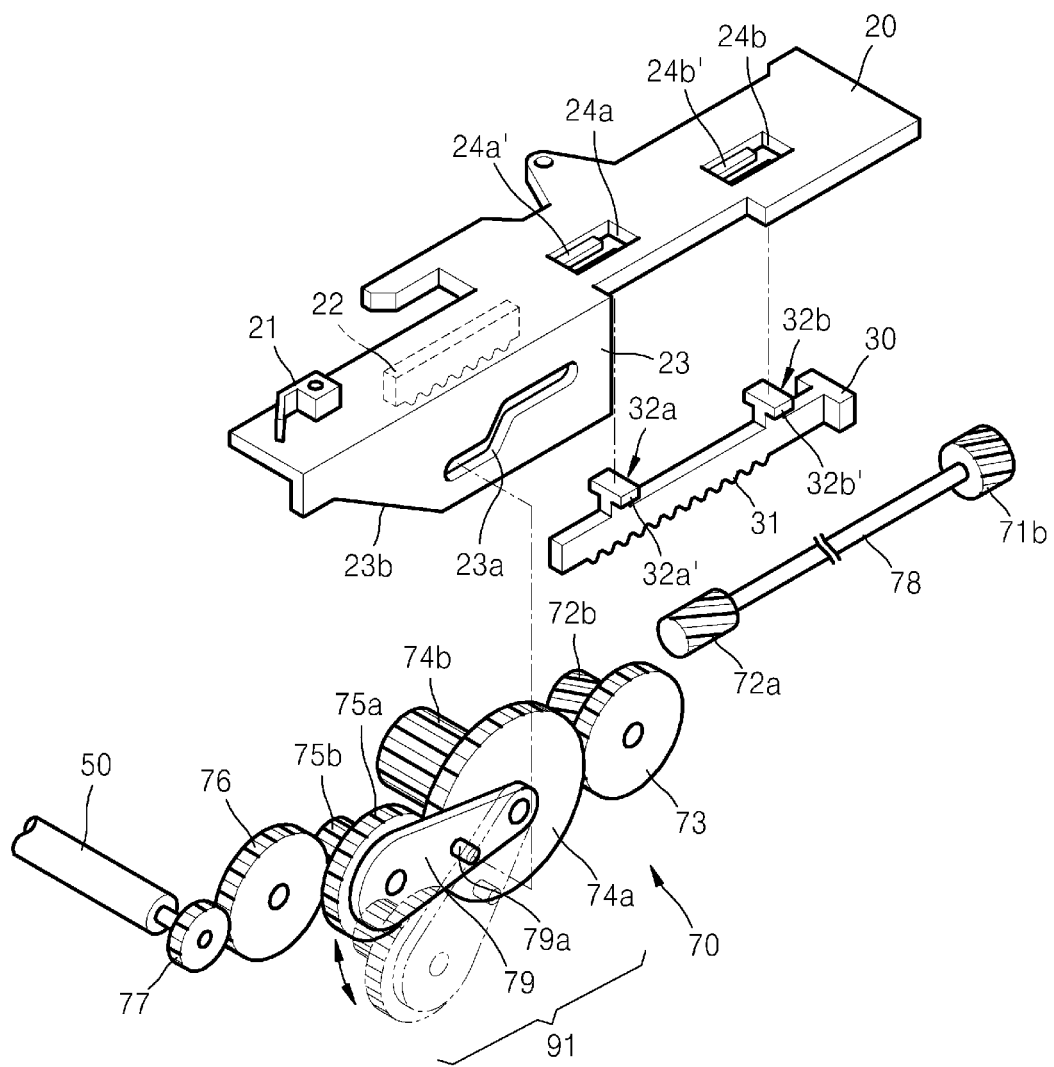
FIG. 4 is a diagram that illustrates an example of a main slider, a sub-slider, and a gear assembly in a disc loading apparatus such as, for example, the disc loading apparatus illustrated in FIG. 1A.

A pair of disc guides 60a and 60b operating in opposite directions are provided at both sides of a front portion of the optical disc drive into which a disc 1 is inserted. A switch 62 is provided in the vicinity of the disc guide 60b. The switch 62 detects the insertion of the disc 1 based on the position of the disc guide 60b. The switch 62 is operatively connected to a control unit (not which controls loading of the disc 1. For example, the control unit may control the operation of a loading motor 40 during the insertion and removal of the disc 1 from the disc loading device. As an example, the control unit may be a processor that receives and detects an output (e.g., a signal) from the switch. For example, the control unit may be a processor that is configured to perform instructions. Instructions which the control unit may perform may be dependent on the output which are received from the switch. A pusher 61 provided at the disc guide 60b engages a slider assembly. As an example, a slider assembly may include a main slider 30 and a sub slider 30. The pusher 61 may engage a main slider 20. The main slider 20 is further described below. A loading roller 50 that is configured to load and unload the disk 1 is provided closed to the disc guides 60a and 60b. For example, the loading roller 50 may be operated by the loading motor 40 via a gear assembly 70 that includes at least one gear. FIG. 4 illustrates an example of an arrangement of the plurality of gears of the gear assembly 70. The loading roller 50 is operatively coupled to a roller lever 80. The roller level 80 may pivot around a rotation shaft 81. Accordingly, a roller gear 77 which is coupled to the loading roller 50 may be combined to or separated from a fourth power transmission gear 76 based on the operation of the roller lever 80. In other words, based on the rotation or pivoting of the roller level, the roller gear 77 which is coupled to the loading roller 50 may selectively positioned in an engagement position in which the roller gear 77 engages the gear assembly 70, or in a disengagement position in which the roller gear 77 is disengaged with the gear assembly 70.

The disc drive device may include a disc support unit 15 which is provided on the base 10. The disc support unit 15 may be facing protrusion which faces the roller 50 and which contacts an edge portion of a loaded disc. As a disc 1 is loaded into the disc drive device, the disc 1 passes between the roller 50 and the disc support unit 15. As an example, the support unit 15 may have an inclined contact surface that is inclined with respect to a plane of the base 10 so as to contact only the edge portion of the loaded disc. As an example, the support unit 15 may be formed via a press process performed on a part of a body of the base 10. As another example, the support unit 15 may be manufactured of plastic.

The disc drive device includes a rotational chuck operator 11 that is provided at the center of the base 10. For example, as illustrated in FIG. 1B, the rotational chuck operator has fixed thereon a rotational chuck 13 that has a disc shape and that fixes the disc 1 to a spindle 14 in order to drive the disc, As an example, the rotational chuck 13 may contact or be positioned separated from the spindle 14 based to the pivot position of the rotational chuck operator 11. The above-described structure and operation are general and thus will not be described in detail herein.

For example, a lever 11a extends from one end of the rotational chuck operator 11. The lever 11a may be operatively connected to the main slider 20 at one side of the base 10. Accordingly, the lever 11a may moves in sync with the main slider 20. The base may also have provided thereon a sub-slider working lever 12 that operates when the disc 1 is fully loaded. For example, if the disc 1 is fully loaded over the base 10, the sub-slider working lever 12 pushes a sub-slider 30 that is coupled to the main slider 20 to be capable of reciprocating by a predetermined distance with respect to the main slider 20. As an example, the sub-slider working lever 12 includes an end which a disc engages as it is further loaded into the disc drive. As the disc engages the end of the sub-slider working lever 12, the sub-slider pivots such that another end of the sub-slider working lever 12 engages the sub-slider 30.

The main slider 20 has provided at one of its sides, a contact member 21 which is operatively engaged by the pusher 61 of the disc guide 60b. The pusher 61 engages the contact member 21 so as to move the contact member 21 a predetermined distance to one side as a disc is unloaded from the disc drive. For example, the pusher 61 and the contact member 21 are elements associated with a power train control system 91 at the initial stage of the disc loading. For example, the power train control system 91 includes an idle gear 75b, a cam lever 79, a cam plate 23, etc. The elements of the power train control system 91 will be understood through the following description.

As an example, as the main slider 20 is pushed in an unloading direction (e.g., illustrated as vertically downward in FIG. 1A), the idle gear 75b of the gear assembly 70 or gearing engaged with the main slider 20 is disengaged from the fourth power transmission gear 76 by the operation of the cam lever 79. For example, the cam lever 79 is pivoted by a channel type cam 23a that is provided at the main slider 20. The idle gear 75b is installed on the cam lever 79. Accordingly, as the idle gear 75 is disengaged from the fourth power transmission, a power transmission train 90 between the loading motor 40 and the loading roller 50 that has been mechanically connected by the idle gear 75b is disconnected as illustrated in FIG. 1A based on the rotation of the cam lever 79. The loading roller 50 which is mechanically decoupled (e.g., disengaged) from the gear assembly 70 which is directly connected to the loading motor 40 is freely rotatable during the disc loading. For example, the loading roller 50 is freely rotatable even when a user suddenly inserts a disc. Because the loading roller 50 is rotatable, the disc drive does not generate (e.g., or at least reduces) scratches to a disc surface. Further, because the power transmission train 90 of the gear assembly 70, which restricts the operation of the loading roller 50 when a disc is unloaded, is disconnected by the idle gear 75b, damage to a disc that is suddenly inserted may be prevented or inhibited.

FIG. 2 schematically illustrates an example of a state in which the disc 1 is loaded in a disc loading apparatus. Referring to FIG. 2, the idle gear 75b is engaged with the fourth power transmission gear 76 and the loading motor 40 is operated to load the disc 1 using the loading roller 50. If the disc 1 is almost fully loaded, as illustrated in FIG. 2, a drive gear 74b is in an idle state. In other words, the drive gear 74b is not engaged with any of a main spur gear 22 and a sub-spur gear 31. The drive gear 74b is not engaged with any of the main spur gear 22 and a sub-spur gear 31 because, although the main spur gear 31 is engaged with the drive gear 74b at the initial stage of loading, the main spur gear 31 escapes from the drive gear 74b as the main slider 20 continuously moves in a loading direction (e.g., illustrated as vertically upward in FIG. 1A). As the disc 1 is further inserted into the disc device, the sub-slider working lever 12 pivots. The sub-slider working lever engages the sub-slider 30 so as to push the sub-slider in the loading direction. Accordingly, the sub-spur gear 31 thereunder engages the drive gear 74b. Thus, until the disc loading is completed, the disc moves to a loading completion position while pushing the main slider 20, based on the rotation of the loading motor 40.

FIG. 3 schematically illustrates an example of a state in which the disc 1 is completely loaded in the disc loading apparatus of FIG. 1A. Referring to FIG. 3, when the loading of the disc 1 is completed, the sub-spur gear 31 is engaged with the drive gear 74b and the roller lever 80 pivots so that the loading roller 50 is positioned so as to be separated from the disc 1. As an example, the main slider 20 includes a cam plate 23 which has an inclined cam 23b. As the main slider 20 moves, the included cam 23b contacts a rotation shaft 78 of the roller gear 77. In the loading process, the main spur gear 22 is engaged with the drive gear 74b and then released therefrom. Thereafter, the sub-slider 30 is engaged by the sub-slider working lever 12 which is pivoted by the disc 1. Accordingly, the sub-spur gear 31 under the sub-slider engages the drive gear 74b. In this state, the rotational chuck operator 11 which is engaged with the main slider 20 is completely pivoted to a disc chucking position so that the rotational chuck 13 is lowered toward the spindle 14 (see FIG. 1B) and the disc 1 placed on the spindle 14 is chucked (e.g., fixed to a spindle).

The disc drive device that is described with reference to FIGS. 1A-3 is of a slot-in type having a loading structure. Unlike a conventional structure in which the loading roller 50 is always directly connected to the loading motor 40, the examples of a disc drive device illustrated in FIGS. 1A-3 include a power transmission train (e.g., a power transmission system) 90 such as the gear assembly 70 which enables a free rotation of the loading roller 50 when the disc 1 is unloaded. For example, as the loading roller 50 freely rotates when the disc 1 is loaded, in spite of the quick insertion of the disc 1, damage to the disc 1 is restricted. After a predetermined time, which is indispensably required for an initialization process, has passed after the disc 1 is inserted, normal disc loading is safely completed by the loading motor 40 controlled by an operation of the control unit that detects the disc insertion via the switch 62.

The control of the power train in the disc unloading state and the connection of the power train after the disc insertion may be effected using a variety of mechanisms.

Figure 5A:
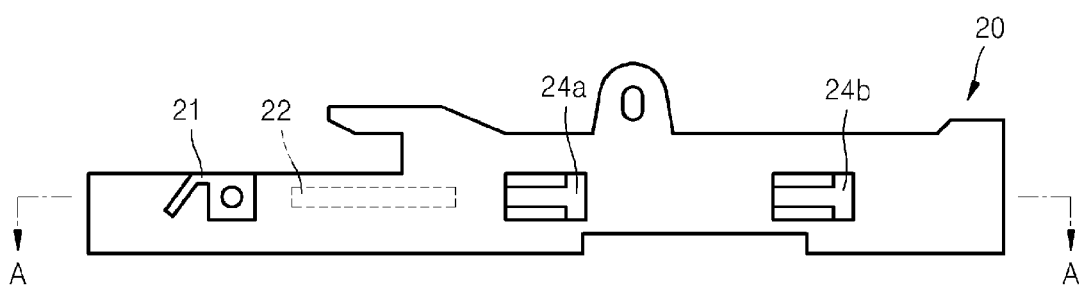
FIGS. 5A and 5B are diagrams that illustrate example of a state in which the main slider and the sub-slider are coupled to each other in a disc loading apparatus such as, for example, the disc loading apparatus illustrated in FIG. 1A.
Figure 5B:
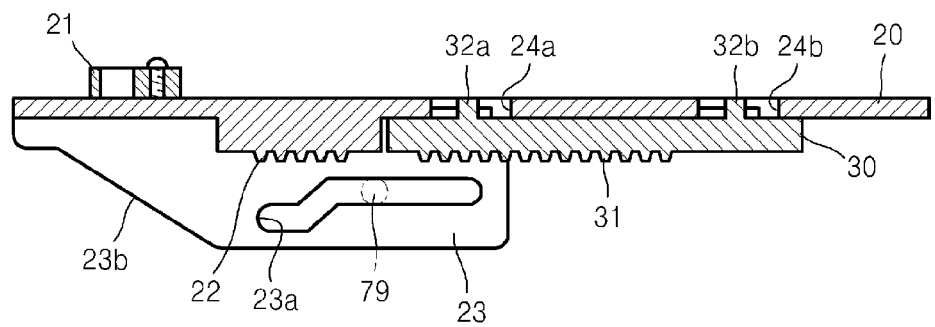
Figure 6:
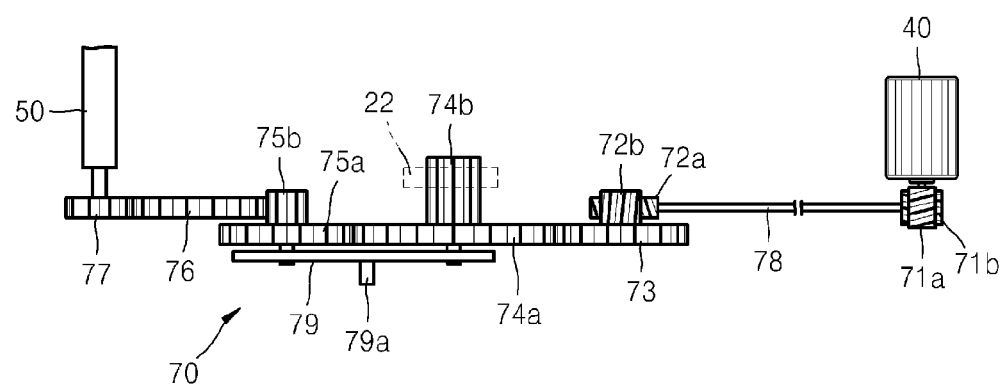
FIG. 6 is a diagram that illustrates an example of the gear assembly in a disc loading apparatus such as, for example, the disc loading apparatus illustrated in FIG. 1A.

FIG. 4 is a drawing illustrating an exploded perspective view of an example of gear assembly 70 that transfers power from the loading motor 40 to the loading roller 50, the main slider 20 coupled to the gear assembly 70, and the sub-slider 30 coupled to the main slider 20. FIG. 5A is drawing that illustrates a plan view of an example of the main slider 20 to which the sub-slider 30 is coupled. FIG. 5B is a cross-sectional view taken along line A-A of FIG. 5A. FIG. 6 is drawing illustrating a plan view of an example of the gear assembly 70 in which a plurality of gears are engaged with one another.

First, referring to FIGS. 4, 5A, and 5B, the contact member 21 is provided at one end portion of an upper surface of the main slider 20 and the main spur gear 22 is provided on a lower surface thereof. The main slider 20 may couple with the sub-slider 30. For example, the main slider 20 may include coupling holes 24a and 24b having a roughly T shape for coupling with the sub-slider 30 may be provided at the rear side of the main slider 20. The sub-spur gear 31 is provided on a lower surface of the sub-slider 30. The sub-slider 30 may have formed on its upper surface coupling protrusions 32a and 32b. As an example, each of the coupling protrusions 32a and 32b have a T shape. The coupling protrusions 32a and 32b are respectively inserted into the coupling holes 24a and 24b so that the sub-slider 30 is coupled to the main slider 20 to be capable of sliding a predetermined distance. As an example, surfaces 24a' and 24b' may be provided at the opposite sides of each of the coupling holes 24a and 24b of the main slider 20. The coupling protrusions 32a and 32b respectively include wings 32a' and 32b' that respectively contact the sliding surfaces 24a' and 24'. The main slider may also include a cam plate 23. The cam plate 23 may include a channel type cam 23a and an inclined cam 23b. The channel type cam 23a may have a shape such that the idle gear 75b can be coupled to and separated from the fourth power transmission gear 76 based on, for example, the positioning of the main slider 20. For example, a working pin 79a of the cam lever 79 where the idle gear 75b is provided may be inserted into the channel type cam 23a. As a portion between the loading roller 50 and the roller gear 77, which is installed at the roller lever 80, contacts the inclined cam 23b, the pivot angle of the roller lever 80 and the position of the loading roller 50 according thereto are determined based on the position of the portion on the inclined cam 23b.

Referring to FIGS. 4 and 6, the rotation shaft 78 is provided in a direction perpendicular to a rotation shaft of the loading motor 40. A first worm wheel 71b corresponding to a drive gear 71a having a worm screw shape of the loading motor 40 is provided at one end of the shaft 78. A worm screw 72a for transferring the power in a perpendicular direction is provided at the other end of the shaft 78. The worm screw 72a may be engaged with a second worm wheel 72b that is coaxially coupled to a first power transmission gear 73 having a predetermined diameter. As an example, the first power transmission gear 73 may be connected to a second power transmission gear 74a that is coaxially coupled to the drive gear 74b. The drive gear 74b may be engaged with the main spur gear 22 or the sub-spur gear 31.

The cam lever 79 is operatively coupled to a rotation shaft of the second power transmission gear 74a to be capable of coaxially pivoting. A third power transmission gear 75a is coupled to the other end of the cam lever 79. The third power transmission gear 75a is always engaged with the second power transmission gear 74a. Idle gear 75b is coaxially coupled to the third power transmission gear 75a. Idle gear 75b may be selectively coupled to or separated from the fourth power transmission gear 76. For example, the idle gear 75b may be positioned to be engaged with the fourth power transmission gear 76 or positioned to be disengaged with the fourth power transmission gear 76. The fourth power transmission gear 76 is engaged with the roller gear 77.

The following description presents an example of the operational relationships between the respective elements during unloading and loading of a disc to help understanding of a disc loading apparatus of the disc drive device.

Figure 7:
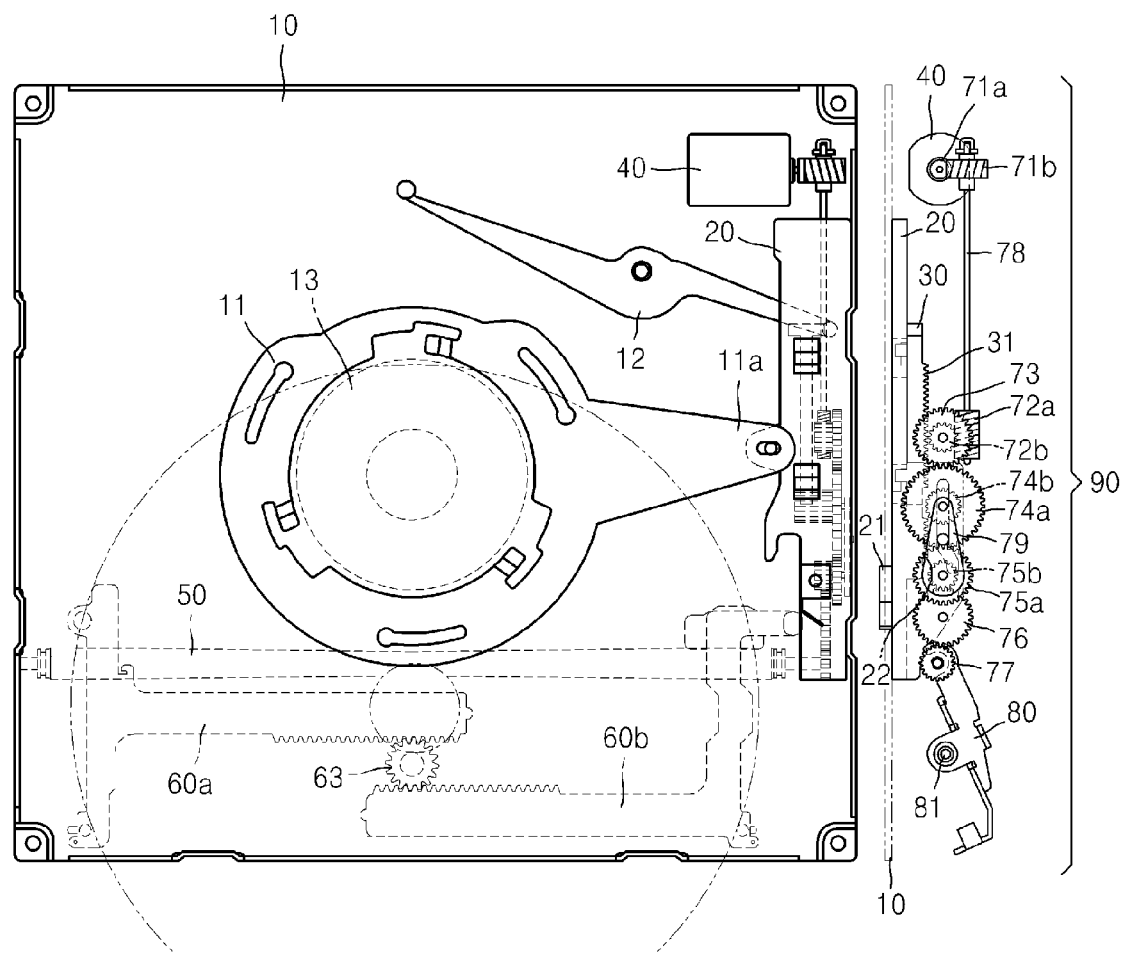
FIGS. 7-10 are diagrams that illustrate examples of a state in which a disc is unloaded from a disc loading apparatus such as, for example, the disc loading apparatus illustrated in FIG. 1A.
Figure 8:
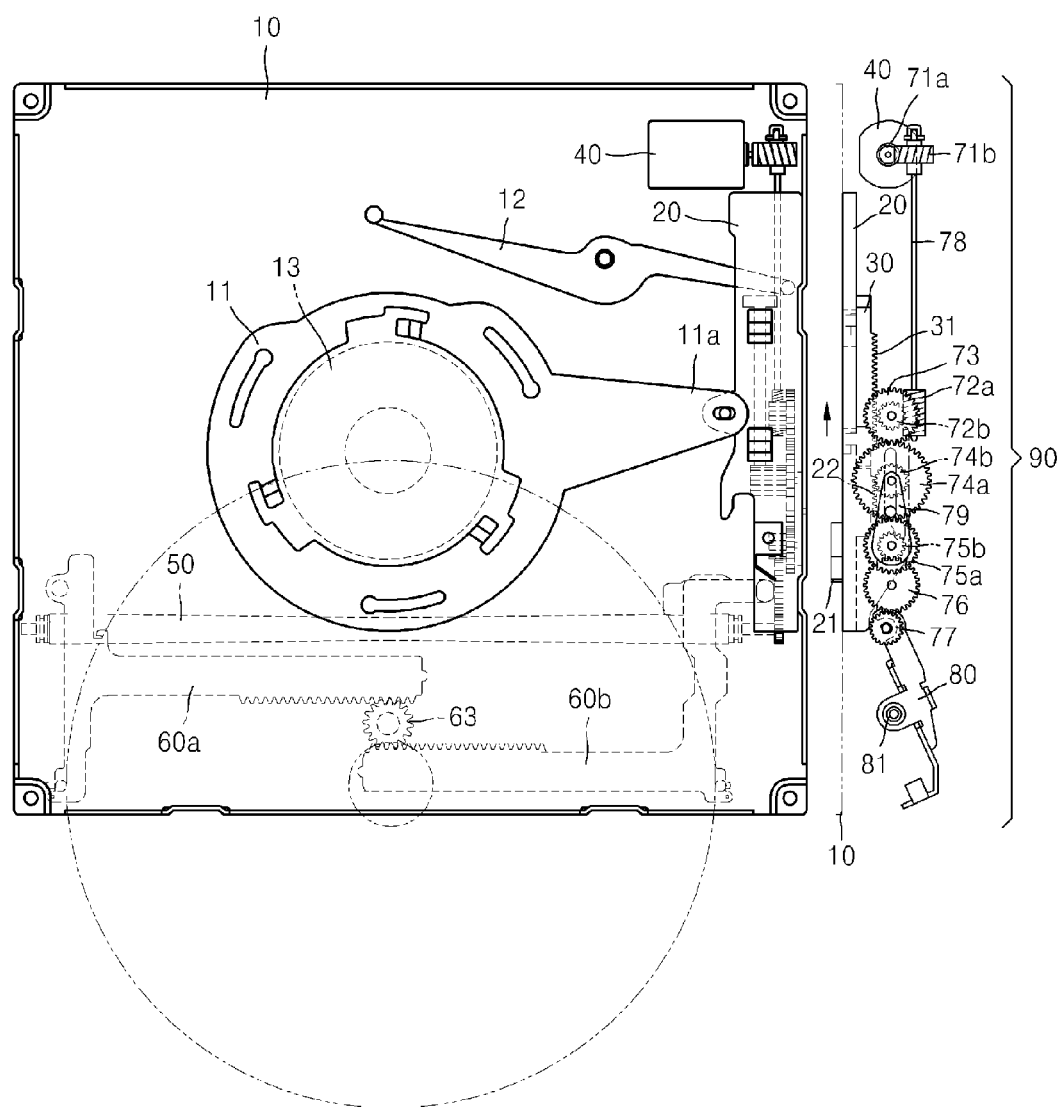
Figure 9:
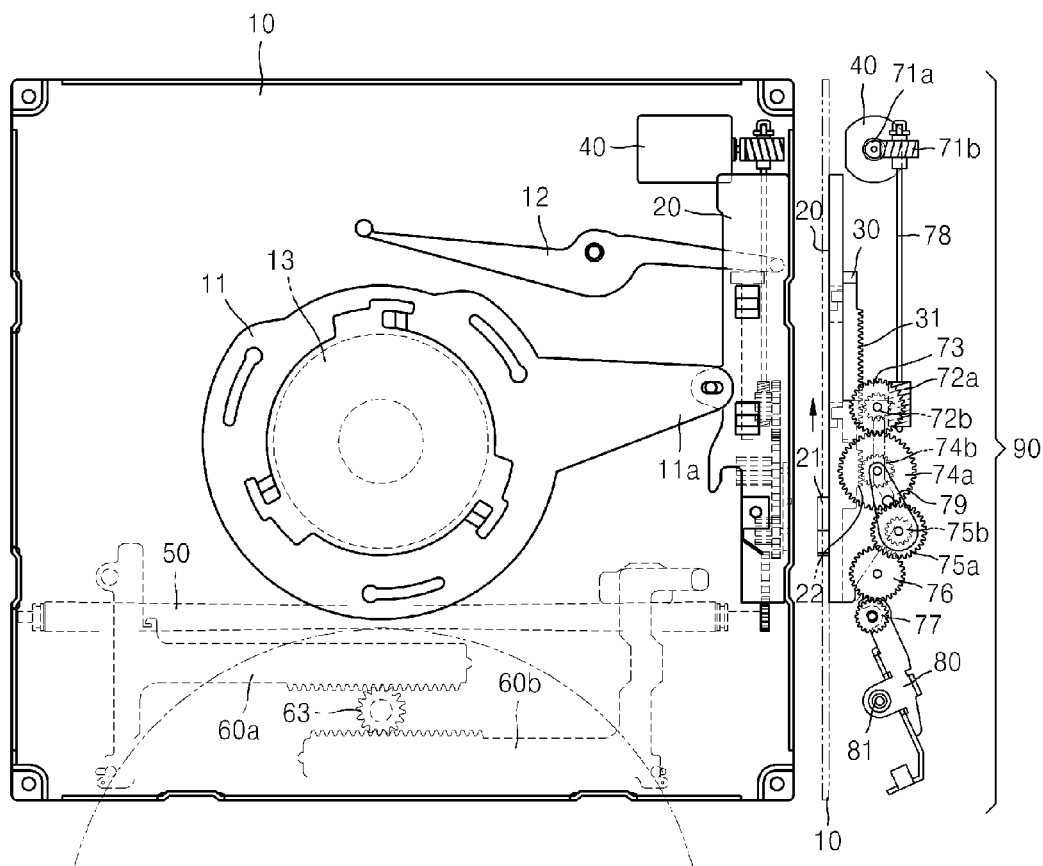

FIGS. 7-9 illustrate an example of the unloading of the disc 1. FIGS. 10-14 illustrate an example of the loading of the disc 1. First, the disc unloading process is described with reference to FIGS. 7-9.

FIG. 7 illustrates a state just after the disc unloading begins from the loading state of FIG. 3. The loading motor 40 is operated so as to move the sub-slider 30 in the unloading direction. The main slider 20 is moved a predetermined distance in the unloading direction. The sub-spur gear 31 of the sub-slider 30 escapes from the drive gear 74b and thus disc clamping is removed by the rotational chuck operator 11. Simultaneously, the loading roller 50, which is separated from the disc 1 due to the inclined cam 23b, contacts the disc 1 as the main slider 20 and the sub-slider 30 move in an unloading direction due to the movement of the roller lever 80 on the inclined cam 23b. The loading roller 50 thus ejects the disc 1. As illustrated in FIG. 8, as the disc 1 is ejected, the disc guides 60a and 60b are separated from each other. When the disc 1 is almost ejected, the pusher 61 of the disc guide 60b engages the contact member 21 of the main slider 20 so as to push the contact member 21 so that the main spur gear 22 of the main slider 20 is engaged with the drive gear 74b. The main slider 20 is completely moved in the unloading direction with respect to the drive gear 74b, and thus, as illustrated in FIG. 9, the cam lever 79 operated by the channel type cam 23a of the cam plate 23 pivots. Thus, the idle gear 75b is separated from the fourth power transmission gear 76 and the loading motor 40 is stopped. In this state, although an end portion of the disc 1 is caught by the loading roller 50, because the loading roller 50 can freely rotate, the disc 1 may be manually removed.

The loading of the disc 1 is performed in the reverse order of the above-described unloading process.

Figure 10:
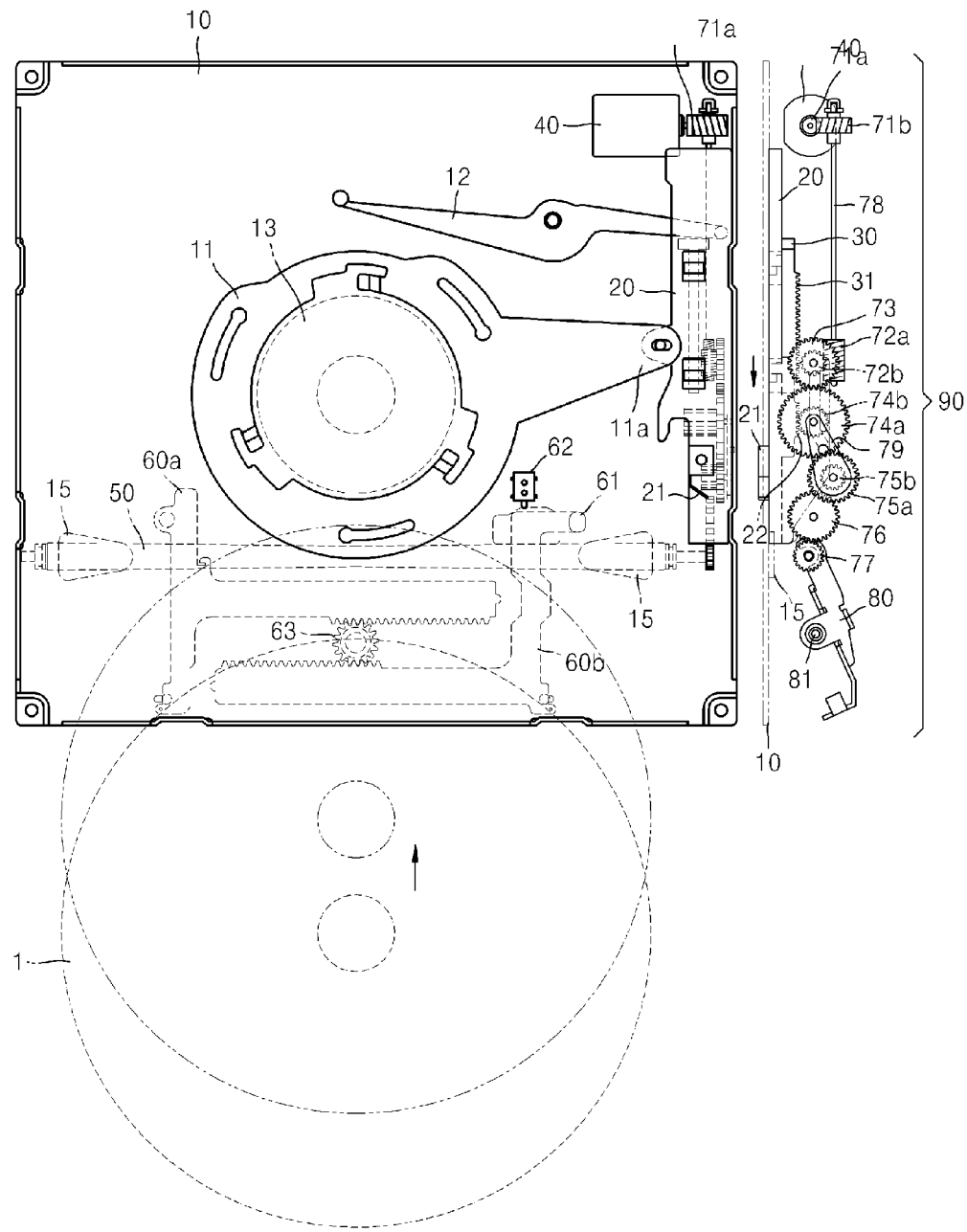
Figure 11:
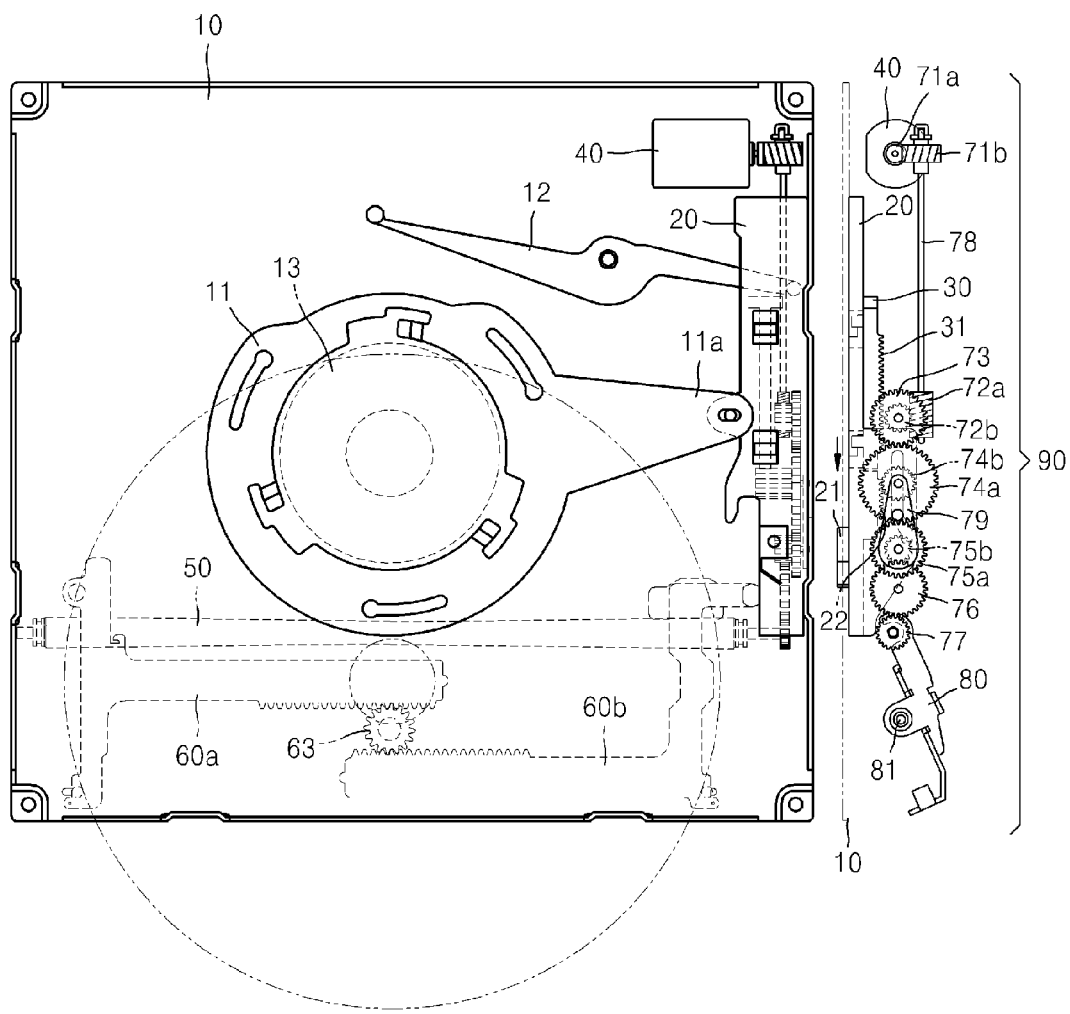
FIGS. 11-14 are diagrams that illustrate examples of a state in which a disc is loaded in a disc loading apparatus such as, for example, the disc loading apparatus illustrated in FIG. 1A.

For example, as it is illustrated in FIG. 10, the disc guides 60a and 60b are separated from each other when the disc 1 is first inserted, and the switch 62 is operated by the disc guide 60b. The control unit receiving a disc insertion signal from the switch 62 initiates driving of the loading motor 40. As an example, a predetermined period of time is needed to drive the loading motor 40. Accordingly, even when a user inserts the disc 1 deeply and the loading motor 40 does not start driving the disc 1, because the loading roller 50 that the disc 1 contacts freely and performs a rolling motion in a state when the loading motor 40 is not driven, no scratches are generated on the disc 1. In other words, because the idle gear 75b is separated from the fourth power transmission gear 76 that is connected to the loading roller 50, the loading roller 50 rotates freely and thus does not generate scratches on the disc 1. When the loading motor 40 starts driving the disc 1, the main slider 20 is moved in the loading direction by the main spur gear 31 that is engaged with the drive gear 74b. As illustrated in FIG. 11, as the main slider 20 is moved, the cam lever 79 is pivoted by the channel type cam 23a of the cam plate 23 such that the idle gear 75b is engaged with the fourth power transmission gear 76 and the rotation of the loading roller 50 begins.

Figure 12:
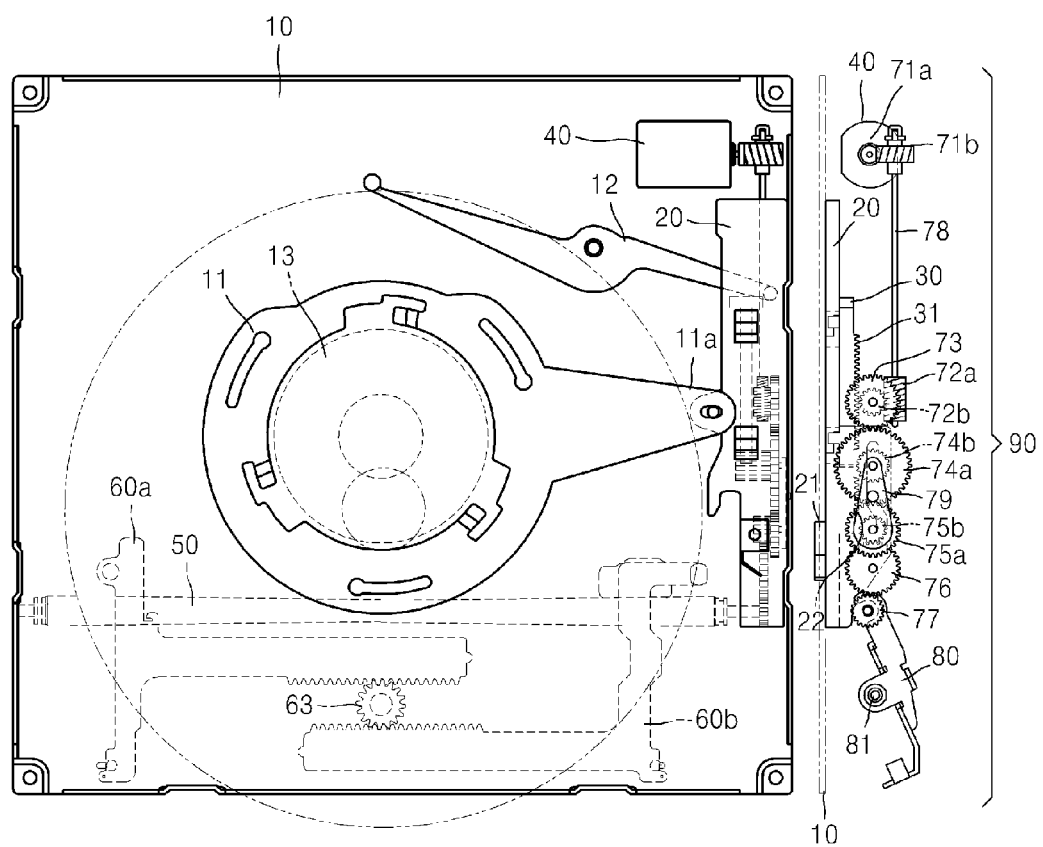

As illustrated in FIG. 12, when the main slider 20 is moved by a certain distance with the loading of the disc 1, the main spur gear 22 is separated from the drive gear 74b. In this state, the drive gear 74b is located between the main spur gear 22 and the sub-spur gear 31. Accordingly, the operation of the main slider 20 is stopped and the loading of the disc 1 continues.

Figure 13:
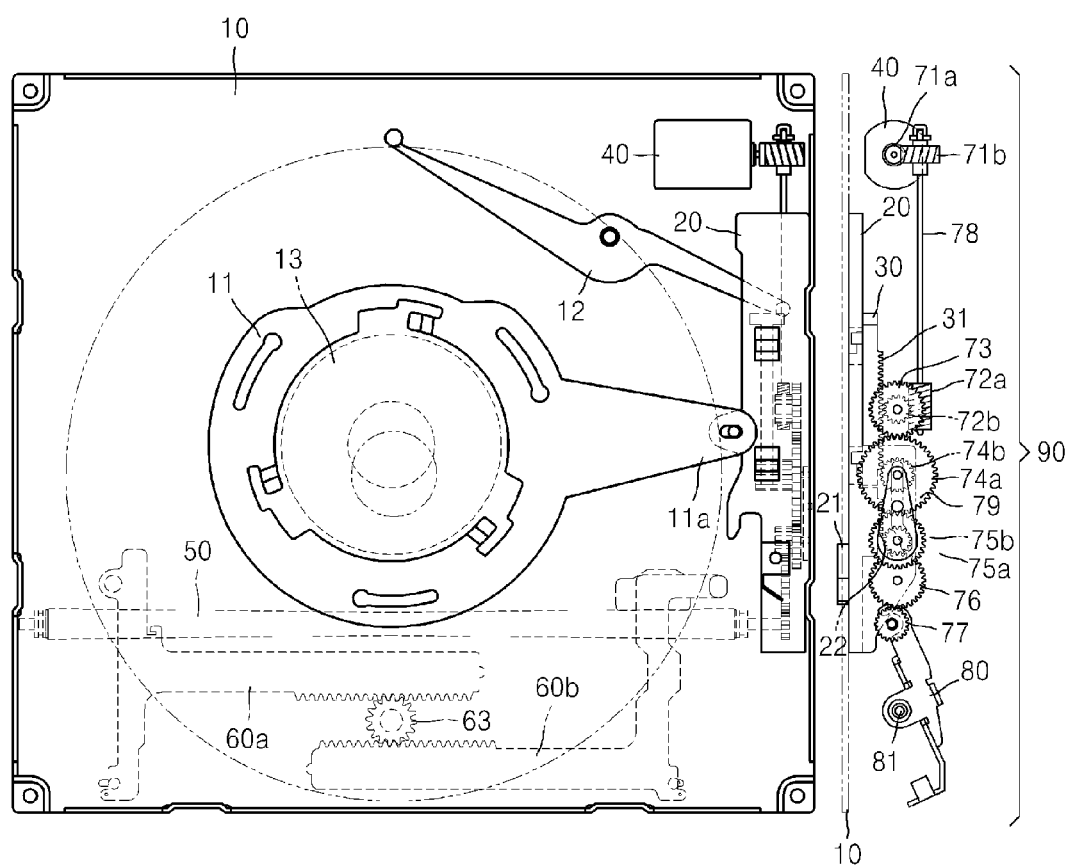
Figure 14:
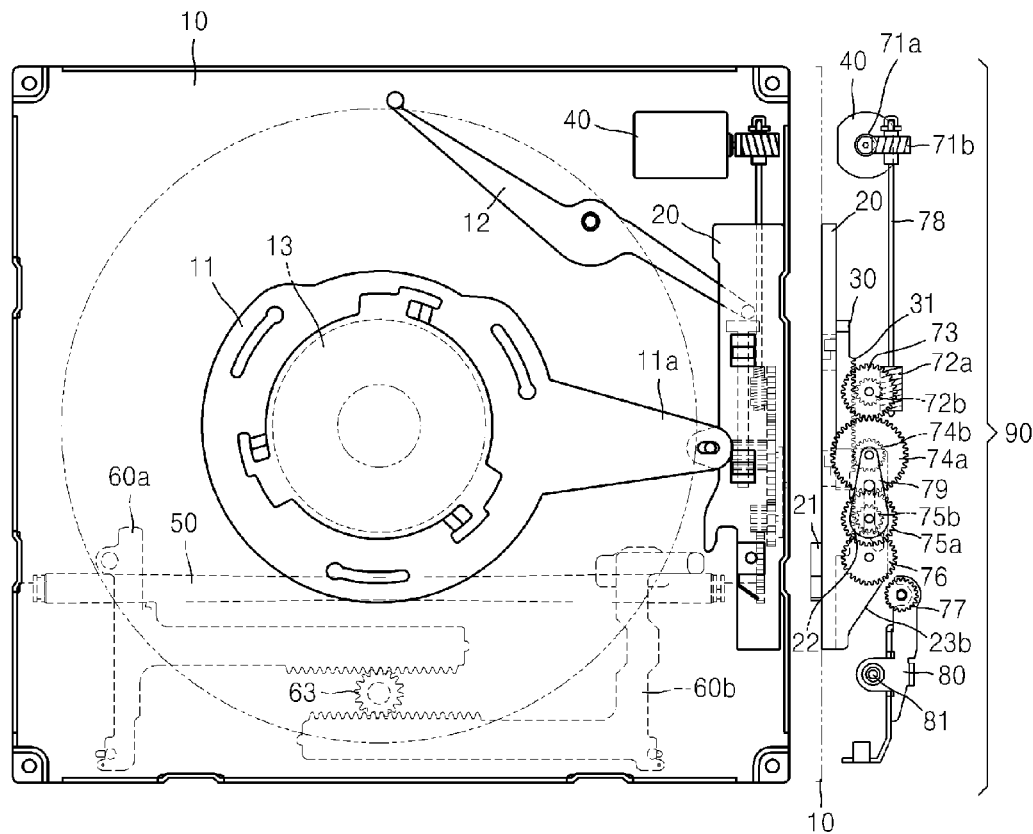

As illustrated in FIG. 13, as disc 1 engages the sub-slider working lever 12 as the disc 1 is loaded, the sub-slider 12 is pivoted such that the sub-slider 12 contacts the sub-slider 30. The sub-slider 30 is pushed in the loading direction such that the sub-spur gear 31 is engaged with the drive gear 74b. Thus, the sub-slider 30 is moved by the drive gear 74b. The main slider 20 is moved together with the sub-slider 30. According to the additional movement of the main slider 20, as illustrated in FIG. 14, the rotational chuck operator 11 interacting with the main slider 20 is pivoted such that the disc 1 is clamped on the spindle. For example, the clamping of the disc 1 takes place as the rotational chuck 13 is lowered according to the pivoting of the rotational chuck operator 11.

The above-described examples of a disc loading apparatus and the optical disc drive device adopting the same have low power consumption. In other words, in an audio-video apparatus having a ready mode in which the power of the disc drive device is cut off or minimized when the disc drive device is not in use, when a disc is forcibly inserted before driving of the loading motor begins, damage to the disc is prevented. As an example, there is a delay time of about 3-5 seconds in a wakeup time before the loading motor is driven after the optical disc drive device recognizes the disc insertion. However, in the disc loading mechanism of a slot-in type using a roller, because the loading roller is restricted by a gear, if the disc is forcibly inserted, a surface of the disc may be damaged by the loading roller. For example, in a slot-in type disc loading mechanism in which a roller is used, the loading roller is strongly pressed by a strong spring acting against the disc support unit to closely contact the disc support. Accordingly, in order to prevent damage to the disc, the power transmission train of the gear assembly is controlled so that the loading roller may freely rotate when the disc is unloaded.

A variety of methods for controlling the power transmission train from the loading motor during the unloading and loading of a disc may be employed. For example, a disc loading/unloading method may include loading a disc in a disc drive device by using a loading roller that is driven by a loading motor through a power transmission train; and unloading the disc by using the loading roller. In the unloading of the disc, the power transmission train between the loading roller and the loading motor is disconnected, and in the loading of the disc the power transmission train is connected.

According to aspects of a disc loading method and an apparatus employing the same, damage to a disc due to forcible insertion of a disc in a roller type loading structure may be prevented. The method is appropriate for a power-saving type disc drive device that cuts off or minimizes power during a non-use period.

In an aspect, there is provided an optical disc drive device in which friction between a roller and a disc due to forcible insertion or removal of a disc may be prevented. In other aspect, there is provided a method of driving the same.

In some aspects, there is provided a disc drive device in which friction between a roller and a disc due to forcible insertion or removal of a disc may be prevented, and a method of driving the same.

For example, in some aspects, there is provided an optical disc drive device in which damage to a recording surface of a disc during a forcible insertion of a disc when a loading mechanism is halted due to discontinuation of power may be prevented, and a method of driving the same.

Disk drives as described in the above examples may be included in an electronic device. As a non-exhaustive illustration only, an electronic device described herein may refer to devices such as a digital camera, a portable game console, a portable/personal multimedia player (PMP), a portable laptop PC, and devices such as a desktop PC, a high definition television (HDTV), an optical disc player, a set top box, and the like which may be capable of wireless communication or network communication.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc loading device, comprising:
   a motor;
   a gear assembly that is configured to be driven by the motor, the gear assembly comprising at least one gear;
   a loading roller that is configured to load and unload a disc into and out of the disc loading device; and
   a power train control system, comprising an idle gear, that is configured to engage the gear assembly with the loading roller such that the motor is configured to be coupled with the loading roller, and disengage the gear assembly from the loading roller such that the motor is configured to be decoupled from the loading roller,
   wherein the idle near is configured to rotate about the at least one near of the gear assembly in order to engage the gear assembly with the loading roller or disengage the gear assembly from the loading roller.

2. The disc loading device of claim 1, wherein the idle gear is configured to be coupled or decoupled with the at least one gear of the gear assembly.

3. The disc loading device of claim 2, wherein the idle gear is coaxially formed with one of the at least one gear of the gear assembly, the gear with which the idle gear is formed has a diameter different from that of the idle gear and is engaged with another of the at least one gear of the gear assembly, which is adjacent to the motor, the idle gear is coupled to a cam lever which is coaxially coupled to a gear in the gear assembly that is adjacent to the motor, and the idle gear is engaged with or disengaged from another of the at least one gear which is adjacent to the loading motor based on pivoting of the cam lever.

4. The disc loading device of claim 1, further comprising:
a slider assembly that is configured to be at least partially driven by the motor, wherein engagement and disengagement of the power train control system is controlled by displacement of the slider assembly.

5. The disc loading device of claim 4, wherein the slider assembly further comprises:
a main slider comprising (i) a gear that is configured to engage the gear assembly such that the gear assembly drives displacement of the slider assembly, and (ii) a cam, forming part of the power train control system, the cam being configured to control positioning of at least one gear of the gear assembly;
a sub slider that is configured to be coupled to the main slider, the sub slider comprising a gear that is configured to engage the gear assembly so as to drive further displacement of the slider assembly.

6. The disc loading device of claim 4, further comprising:
a chucking unit that is configured to fix the disc to a spindle; and
a disc guide that is configured to guide insertion of the disc, wherein the slider assembly is configured to control the chucking unit, and
the disc guide comprises a pusher that is configured to engage the main slider.

7. The disc loading device of claim 6, wherein the power train control system further comprises an idle gear that is configured to be coupled or decoupled with at least one gear of the gear assembly.

8. The disc loading device of claim 7, wherein the power train control system further comprises:
a cam lever to which the idle gear is coupled, the cam lever being coupled to at least one gear of the gear assembly so as to be capable of coaxially pivoting; and
a cam plate, which is configured to operate the cam lever, the cam plate being provided on the main slider.

9. The disc loading device of claim 8, wherein the cam plate has a channel type cam formed therein, and wherein a working pin for operation of the cam lever is provided on the cam lever, the working pin being positioned so as to be controlled by the channel type cam.

10. A disc drive device comprising:
a chuck that fixes a disc to a spindle;
a chucking unit that is configured to control the chuck;
a motor;
a loading roller that is configured to be driven by the motor and load and transfer the disc toward the chuck;
a gear assembly that is configured to be driven by the motor, the gear assembly comprising at least one gear; and
a power train control system, comprising an idle gear, that is configured to engage the gear assembly with the loading roller such that the motor is configured to be coupled with the loading roller, and disengage the gear assembly from the loading roller such that the motor is configured to be decoupled from the loading roller,
wherein the idle gear is configured to rotate about the at least one gear of the gear assembly in order to engage the gear assembly with the loading roller or disengage the gear assembly from the loading roller.

11. The disc drive device of claim 8, wherein the idle gear is configured to be coupled or decoupled with the at least one gear of the gear assembly.

12. The disc drive device of claim 9, where the idle gear is coaxially formed with one of the at least one gear of the gear assembly, the gear with which the idle gear is formed has a diameter different from that of the idle gear and is engaged with another of the at least one gear of the gear assembly, which is adjacent to the motor, the idle gear is coupled to a cam lever which is coaxially coupled a gear included in the gear assembly that is adjacent to the motor, and the idle gear is engaged with or disengaged from another of the at least one gear which is adjacent to the loading motor based on pivoting of the cam lever.

13. The disc loading device of claim 10, further comprising:
a slider assembly that is configured to be at least partially driven by the motor, wherein engagement and disengagement of the power train control unit is controlled by displacement of the slider assembly.

14. The disc loading device of claim 13, wherein the slider assembly further comprises:
a main slider comprising (i) a gear that is configured to engage the gear assembly such that the gear assembly drives displacement of the slider assembly, and (ii) a cam, forming part of the power train control system, the cam being configured to control positioning of at least one gear of the gear assembly;
a sub slider that is configured to be coupled to the main slider, the sub slider comprising a gear that is configured to engage the gear assembly so as to drive further displacement of the slider assembly.

15. The disc drive device of claim 14, further comprising:
a disc guide that is configured to guide insertion of the disc, and
a chucking unit that is configured to control the chuck,
wherein the slider assembly is configured to control the chucking unit, and
the disc guide comprises a pusher that is configured to engage the main slider.

16. The disc drive device of claim 15, wherein the power train control system further comprises an idle gear that is configured to be coupled or decoupled with at least one gear of the gear assembly.

17. The disc drive device of claim 16, wherein the power train control system further comprises:
a cam lever to which the idle gear is coupled, the cam lever being coaxially coupled to at least one gear of the gear assembly so as to be capable of pivoting; and
a cam plate which is configured to operate the cam lever, the cam plate being provided on the main slider.

18. The disc drive device of claim 17, wherein the cam plate has a channel type cam formed therein, and
wherein the cam lever comprises a working pin that is positioned such that the working pin is configured to be controlled by the channel type cam.

19. A disc loading method, the method comprising:
loading a disc in a disc drive device by using a loading roller that is driven by a motor through a power transmission train comprising a gear assembly and an idle gear;
unloading the disc by using the loading roller; and rotating the idle gear about at least one gear of the gear assembly in order to engage the gear assembly with the loading roller or disengage the gear assembly from the loading roller, wherein, in response to the unloading of the disc, the power transmission train between the loading roller and the loading motor is disengaged, and in response to the loading of the disc, the power transmission train is engaged.

20. The disc loading method of claim 19, wherein the idle gear connects and disconnects power between the gear assembly, and the power transmission train is configured to be controlled by the idle gear.

21. The disc loading method of claim 20, wherein a position of the idle gear is adjusted by a cam structure that is operated based on insertion of the disc.

22. An electronic device, the electronic device comprising the disc drive of claim 1.

23. The electronic device of claim 22, wherein the electronic device is one of a portable game console, a portable/personal multimedia player (PMP), a portable lap-top PC, a desktop PC, a high definition television (HDTV), an optical disc player, and an optical disc recorder.

* * * * *